United States Patent [19]
Yamawaki et al.

[11] Patent Number: 5,721,977
[45] Date of Patent: Feb. 24, 1998

[54] DISTANCE MEASURING APPARATUS OF CAMERA IMPROVED IN MEASURING PROCESS

[75] Inventors: Takeshi Yamawaki, Osaka; Kenji Nakamura, Sakai; Akira Shiraishi, Sakai; Kazumi Kageyama, Sakai, all of Japan

[73] Assignee: Minolta Co., Ltd., Osaka, Japan

[21] Appl. No.: 784,996

[22] Filed: Jan. 17, 1997

[30] Foreign Application Priority Data

Jan. 19, 1996 [JP] Japan .................. 8-007899
Nov. 27, 1996 [JP] Japan .................. 8-316074

[51] Int. Cl.$^6$ ........................................... G03B 13/36
[52] U.S. Cl. ......................... 396/92; 396/96; 396/128
[58] Field of Search ........................... 396/89, 92, 96, 396/128

[56] References Cited

U.S. PATENT DOCUMENTS

| | | | |
|---|---|---|---|
| 4,469,417 | 9/1984 | Masunaga et al. | 396/128 |
| 4,475,800 | 10/1984 | Kinoshita et al. | 396/92 |
| 4,870,441 | 9/1989 | Yamasaki | 396/96 |
| 4,952,963 | 8/1990 | Akashi | 396/96 |
| 4,952,966 | 8/1990 | Ishida et al. | 396/96 |
| 5,051,767 | 9/1991 | Honma et al. | |

FOREIGN PATENT DOCUMENTS 59204704A 11/1984 Japan .

*Primary Examiner*—Russell E. Adams
*Attorney, Agent, or Firm*—Burns, Doane, Swecker & Mathis, LLP

[57] ABSTRACT

A distance measuring apparatus includes a pair of line sensors. An image of an object is projected on the line sensor through a lens. The distance up to an object is measured according to the object image in the line sensor. The line sensor includes a plurality of pixels (CCD). The time period for respective pixels to complete charge accumulation with the pixel first completing charge accumulation as the pixel of quantizing reference becomes the data for the respective pixels. In the present invention, the range of pixels used for quantizing reference is altered according to variation in the focal length of the lens. The operation of distance measurement is terminated when charge accumulation for all the pixels within the range of the integration completion determination ends. The range of integration completion determination is altered according to the focal length, the measured brightness value and the shooting mode.

12 Claims, 13 Drawing Sheets

▨▨▨ ··· QUANTIZING REFERENCE SELECT RANGE

FIG. 11

| COUNT VALUE | LUMINANCE BRIGHTNESS OF PIXEL (EV) |
|---|---|
| 0 | x |
| ≀ | ≀ |
| 63 | x−1 |
| ≀ | ≀ |
| 127 | x−2 |
| ≀ | ≀ |
| 191 | x−3 |
| ≀ | ≀ |
| 255 | x−4 |

(PIXEL OF QUANTIZING REFERENCE)

(PIXEL DARKER BY 4EV THAN PIXEL OF QUANTIZING REFERENCE)

DISTANCE MEASURING APPARATUS OF CAMERA IMPROVED IN MEASURING PROCESS

BACKGROUND OF THE INVENTION

1. Field of the Invention

The present invention relates to a distance measuring apparatus of a camera including a photographic lens with variable focal length and a finder optical system with variable field magnification in association with the focal length of the photographic lens. Particularly, the present invention relates to a camera distance measuring apparatus suitable for the passive triangular distance measuring system with the finder optical system and the autofocus optical system having different optical axes.

2. Description of the Related Art

A distance measuring apparatus employing the passive triangular distance measuring system taking advantage of light is conventionally known. This type of distance measuring system includes an autofocus optical system, and is implemented to receive the taken image of an object with a pair of line sensors. The respective obtained image data are subjected to correlation calculation to obtain range data. The autofocus optical system is provided on an optical axis differing from that of the photographic autofocus system and finder optical system. When the focal length of the photographic lens is altered in such a camera, there will be a discrepancy between the distance measuring frame in the finder and the actual distance measuring area. There is a disadvantage that focus will be attained for a subject not intended by the shooter.

A camera is proposed that carries out distance measure calculation only using pixel data of an area corresponding to the distance measuring frame out of the actual distance measuring area even when the focal length is altered (Japanese Patent Laying-Open No. 2-293833).

In Japanese Patent Laying-Open No. 59-204704, a distance measuring apparatus is disclosed for calculating the distance up to an object quantizing the image of the object received at the line sensor according to the time difference from a quantizing reference time using the charge accumulation time of the brightest pixel as the quantizing reference time for calculation.

When the distance is measured at the telephoto limit using the above-described camera employing such a distance measuring apparatus, sufficient contrast cannot be obtained for the pixel data corresponding to the main object portion in the distance measuring frame in the case where there is a light source and the like of extremely high luminance (such as a lamp) outside the distance measuring frame since quantization is carried out on the basis of the accumulation time of the pixel of the light source portion (FIG. 17). The calculated distance up to the main object in the distance measuring frame was, if obtained, greatly offset.

Another conventional distance measuring apparatus is known for measuring the distance up to an object by image-forming the light from an object to a pair of line sensors including a plurality of pixels by the lens.

In this distance measuring apparatus, charge is accumulated from the time point where the brightest pixel in the line sensor (the pixel receiving the brightest light) completes its charge accumulation as the basis up to the time point where a pixel darker by 4 levels (4 EV: exposure value) than the brightness of the brightest pixel carries out charge accumulation. Calculation for distance measuring is carried out according to the time period starting from completion of charge accumulation of the brightest pixel until completion of charge accumulation of each pixel.

This distance measuring apparatus has problems set forth in the following.

(1) When the brightness luminance is low and the background is darker than the object, the time required for distance measurement is increased. This causes the problem that a precise distance measuring result cannot be obtained due to the effect of camera-shaking and the like during this period.

(2) When a structure is employed where all the region in the line sensor is not used and the non-used portion is masked, the time required for charge accumulation to end becomes longer due to the mask portion, resulting in unnecessary increase in the distance measuring time.

SUMMARY OF THE INVENTION

An object of the present invention is to provide a distance measuring apparatus of a camera that can calculate the distance up to the main object in a distance measuring frame even in the case where there is a very bright light and the like (lamp) outside the distance measuring frame with respect to a main object (a person) in the distance measuring apparatus.

Another object of the present invention is to provide a camera distance measuring apparatus that can have the time for distance measurement reduced, and a camera using such a distance measuring apparatus.

According to an aspect of the present invention, a distance measuring apparatus includes a pair of photoreceptor arrays of a plurality of pixels, a detector for detecting the focal length of a photographic lens, a select circuit for selecting a pixel out of the plurality of pixels that can be set as the quantizing reference according to a detected result of the detector, a setting circuit for setting the time when at least one selected pixel completes charge accumulation as the quantizing reference time, and a measurement unit for quantizing an output of the photoreceptor array to measure the distance up to the object according to the set quantizing reference time.

According to another aspect of the present invention, a distance measuring apparatus includes a pair of photoreceptor arrays of a plurality of pixels, a measurement unit for measuring the distance up to an object by quantizing an output from the photoreceptor array, a select circuit for selecting a pixel that can be set as a quantizing reference out of the plurality of pixels according to a measured result of the measurement unit, and a setting circuit for setting the time when at least one selected pixel completes charge accumulation as the quantizing reference time.

According to a further aspect of the present invention, a distance measuring apparatus includes a pair of photoreceptor arrays of a plurality of pixels, a select circuit for selecting a pixel to be used for determination of integration completion out of the plurality of pixels, a determination circuit for determining integration completion using a signal from a selected pixel, and a measurement unit for measuring the distance up to an object by quantizing an output from the photoreceptor array.

According to still another object of the present invention, a distance measuring apparatus includes a pair of photoreceptor arrays of a plurality of pixels, a focal length detection circuit for detecting the focal length of a projective lens, a select circuit for selecting a pixel used in quantizing the reference and a pixel used in integration completion determination according to the detected focal length, and a measurement unit for measuring the distance up to an object by quantizing an output from the photoreceptor array according to an output of a selected pixel.

Advantages of the present invention are set forth in the following. Firstly, distance measurement efficiency is improved. This is because a pixel not associated in the distance measuring operation is not used as the quantizing reference since a pixel is selected according to the focal distance of the photographic lens which can be used as the reference for quantization.

Secondly, the discrepancy between the area of the distance measuring frame and the actual distance measuring area can be reduced since a pixel that is set as the pixel for quantizing reference is selected according to the distance up to an object.

Thirdly, the distance measurement time can be reduced even when the luminance is low since a pixel used for determining integration completion is selected from a plurality of pixels.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows the relationship between a count value of a counter 37 of FIG. 10 and brightness luminance of a pixel that provides a latch signal at that time point.

DESCRIPTION OF THE PREFERRED EMBODIMENTS

First Embodiment

Figure 1:
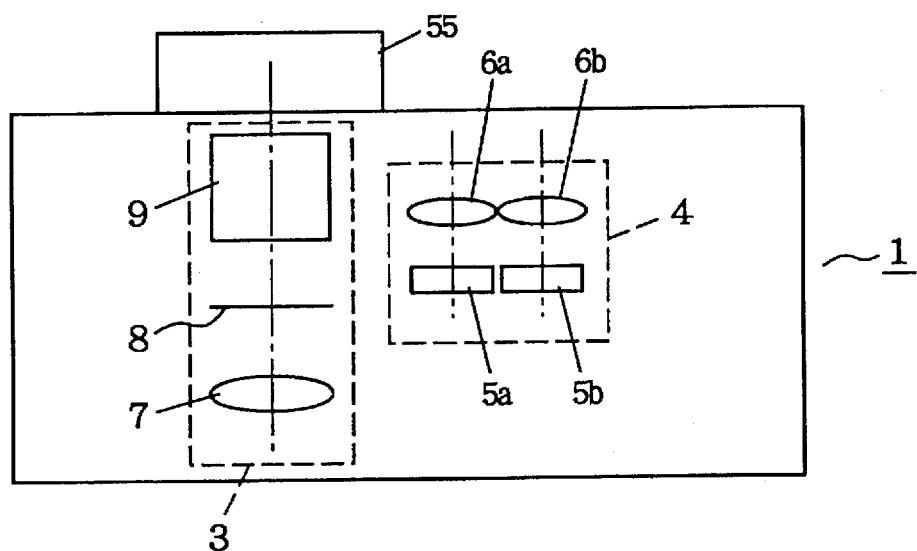
FIG. 1 shows an optical system of a camera adapting a distance measuring apparatus according to a first embodiment of the present invention.

Referring to FIG. 1, a camera body 1 includes a photographic variable magnification lens 55 of variable focal length, a finder 3 and a distance measuring unit 4 for distance measurement. The focal length of photographic variable magnification lens 55 is switchable among the three levels of 35 mm, 70mm and 105 mm. Finder 3 is a real image type zoom finder to form an image of an object on an image forming plane 8 by an objective lens 9. The image of an object can be viewed through an eye piece 7. Objective lens 9 moves in cooperation with photographic variable magnification lens 55 to have the focal length altered according to the focal length of photographic variable magnification lens 55. A distance measuring frame (fixed) is drawn on image-forming plane 8. Distance measuring unit 4 includes a pair of line sensors 5a and 5b, and AF (autofocus) lens 6a and 6b for forming an image of the object on line sensor 5a and 5b. The focal length of AF lens 6a and 6b is constant independent of the focal length of photographic variable magnification lens 55.

Although the size of an object image in the finder by objective lens 9 in finder 3 changes when the focal length of photographic variable magnification lens 55 is altered, the size of the distance measuring frame and the focal length of AF lens 6a and 6b do not change. Therefore, there will be a discrepancy between the area enclosed by the distance measuring frame in the finder and the actual distance measuring area (parallax due to change in focal length). The camera of the present invention is implemented so that the area in the distance measuring frame and the distance measuring area match when the focal length of photographic variable magnification lens is 35 mm. If the focal length of photographic variable magnification lens 55 is altered to 70 mm or 105 mm, the distance measuring area will become larger than the area of the distance measuring frame. Also, there is a discrepancy between the area of the distance measuring frame and the actual distance measuring area when the distance from the object becomes smaller (parallax due to change in object distance) since finder 3 and distance measuring unit 4 are disposed spaced apart horizontally in the camera.

Figure 2:
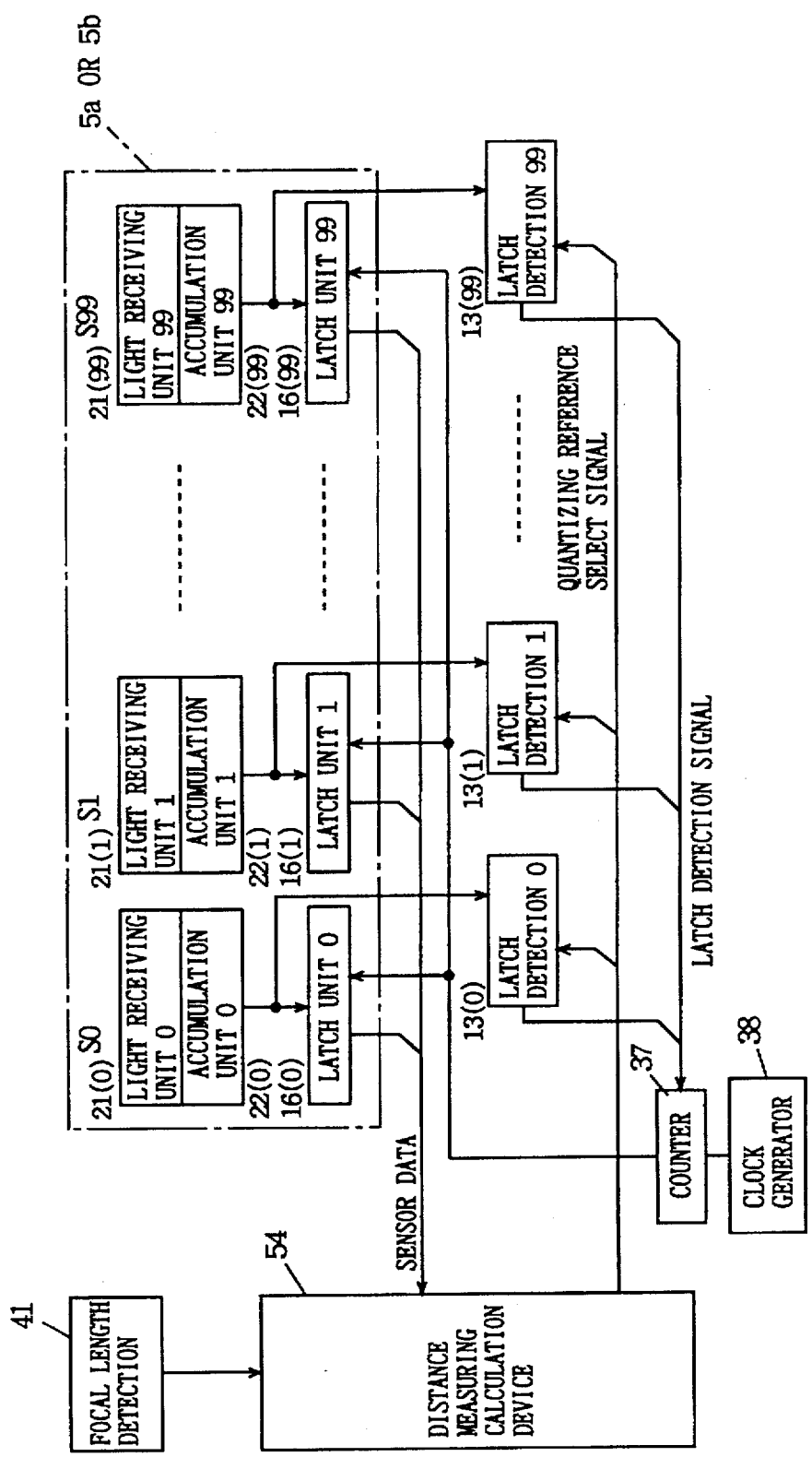
FIG. 2 is a block diagram of the distance measuring apparatus of the camera of FIG. 1.

Referring to the block diagram of FIG. 2 of the distance measuring apparatus of the present invention, one of the pair of line sensors 5a and 5b is formed of 100 pixels (S0–S99). Each pixel includes a light receiving unit 21(0)–21(99) and an accumulation unit 22(0)–22(99). For the sake of simplification, only one of the pair of line sensors 5a and 5b is shown.

Figure 3:
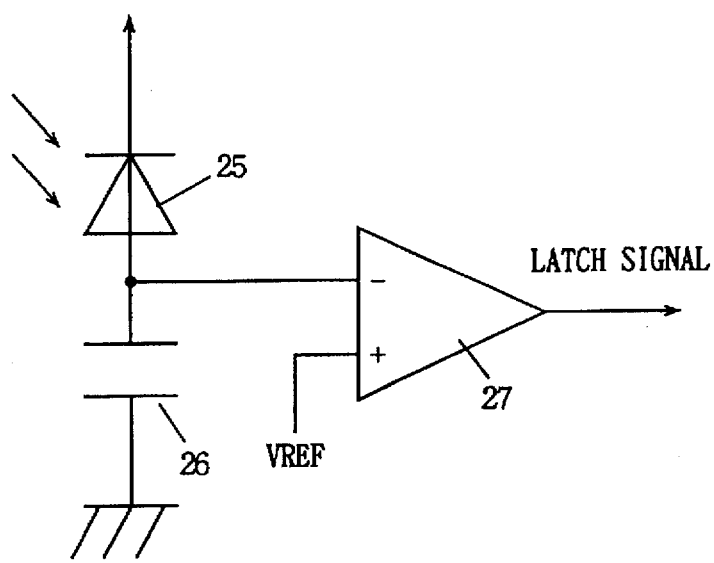
FIG. 3 shows the structure of a light receiving unit 21 and an accumulation unit 22 of the distance measuring apparatus of FIG. 2.

The structure of light receiving unit 21 and accumulation unit 22 of one pixel of line sensors 5a and 5b is shown in FIG. 3. A current generated in response to light entering light receiving unit 25 is stored in a capacitor 26. A sense amplifier 27 provides a latch signal when the voltage of capacitor 26 arrives at a predetermined voltage VREF. Capacitor 26 is reset by reset means not shown prior to initiation of charge accumulation for distance measurement. In response, charge accumulation is initiated from 0 V.

Referring to FIG. 2, a latch detection unit 13(0)-13(99) is provided for each pixel to receive a latch signal output from the sense amplifier of each pixel. A latch detect signal is output from latch detection unit 13 if the corresponding pixel is selected as the pixel used for quantizing reference by a distance measuring calculation device 12. A counter 37 is connected to latch detect unit 13(0)-13(99) to initiate counting in response to the first latch detection signal generated after charge accumulation for distance measurement is initiated. Counter 37 is set to 0 at the time of initiating charge accumulation. Counter 37 increments the count at every pulse output from clock generator 38. Latch unit 16(0)-16(99) receives and latches the count value of counter 37 upon receiving a latch signal from a corresponding pixel. Distance measuring calculation device 54 receives focal length data of photographic variable magnification lens 55 from focal length detection unit 41. Distance measuring calculation device 54 selects a pixel used for quantizing reference according to the input focal length data. Detection of the focal length of photographic variable magnification lens 55 is carried out by an encoder provided at the lens barrel and the like.

The operation of this distance measuring apparatus will be described hereinafter.

When initiation of charge accumulation for distance measurement is designated by a signal not shown to distance measuring calculation device 54, each pixel (S0–S99) of line sensors 5a and 5b initiates charge accumulation simultaneously. When the voltage of capacitor 22 of a pixel SX receiving the greatest light (brightest pixel) arrives at a predetermined voltage VREF, a latch signal is output. Assuming that pixel SX is selected as the pixel used for quantizing reference by a microprocessor 12, latch detection unit 13(X) corresponding to pixel SX provides the latch detection signal. In response, counter 37 initiates counting. Latch unit 16(X) receives and latches the count value of counter 37 when the latch signal is input. Therefore, the data of latch unit 16(X) corresponding to the brightest pixel SX is 0.

Then, the other pixels output a latch signal at an elapse of a time according to the received light intensity. Latch unit 16 corresponding to a pixel latches the count value of counter 37 at the time point when a latch signal is input. Therefore, a corresponding latch unit 16 latches data corresponding to time period on the basis of a time point when the brightest pixel SX outputs a latch signal up to a time point when respective pixels output a latch signal. Distance measuring calculation device 54 obtains data of each pixel by reading in the latch data of latch units 16(0)–16(99) after completion of charge accumulation.

Each latch detection unit 13(0)–13(99) is connected to distance measuring calculation apparatus 54. When a quantizing reference select signal is not input, a latch detection signal is not output even when a latch signal is input. Therefore, data 0 will be latched for a pixel not selected as the pixel used in quantizing reference and that is brighter than the brightest pixel selected as the pixel used for quantizing reference since the non-select pixel latches the data of counter 37 before it initiates counting.

Figure 4:
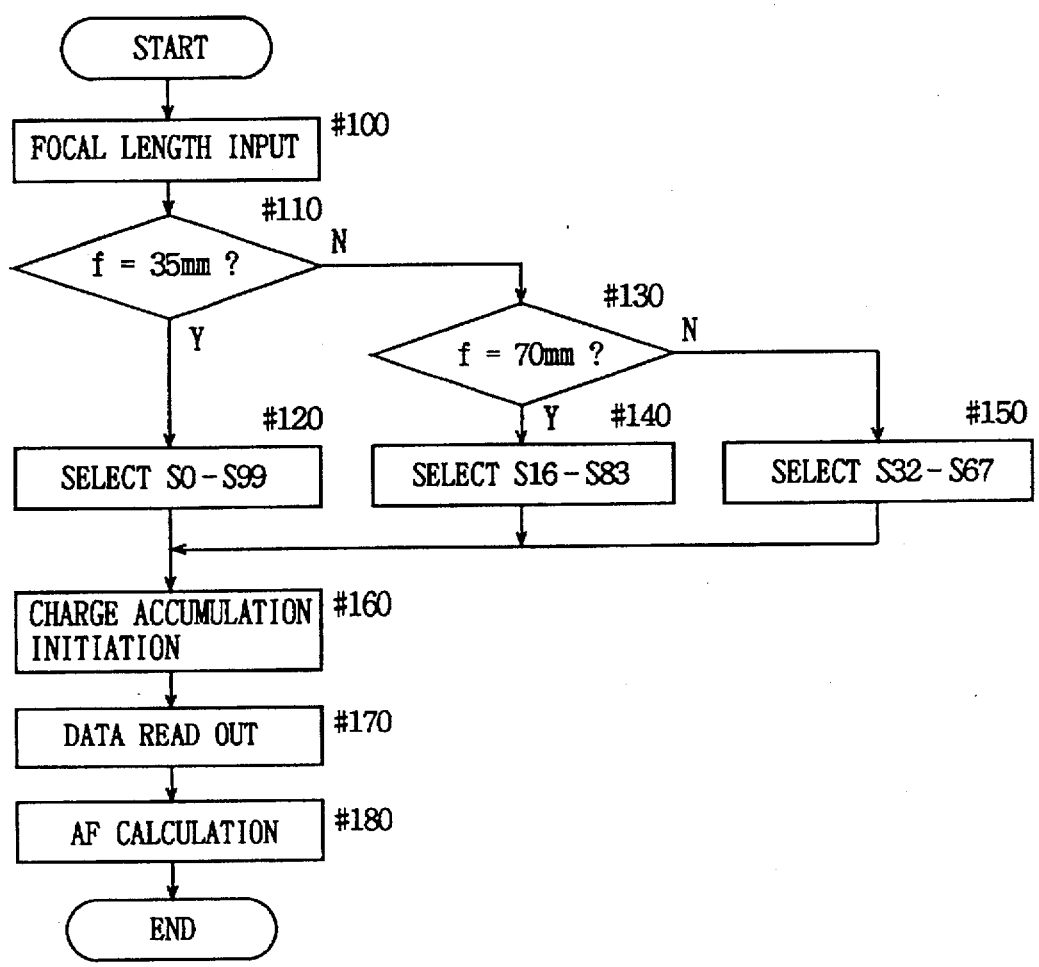
FIG. 4 is a flow chart showing an operation of the distance measuring apparatus of FIG. 2 in distance measurement.

FIG. 4 is a flow chart showing the distance measuring operation of the distance measuring apparatus according to the present invention.

First, the focal length of photographic variable magnification lens 55 is input (#100). The pixel used for quantizing reference is selected according to the focal length of photographic variable magnification lens 55 (#110–#150). Charge is accumulated (#160). The sensor data for all pixels are read out (#170). AF calculation is carried out according to the read out data (#180) to complete the distance measuring operation.

Figure 5:
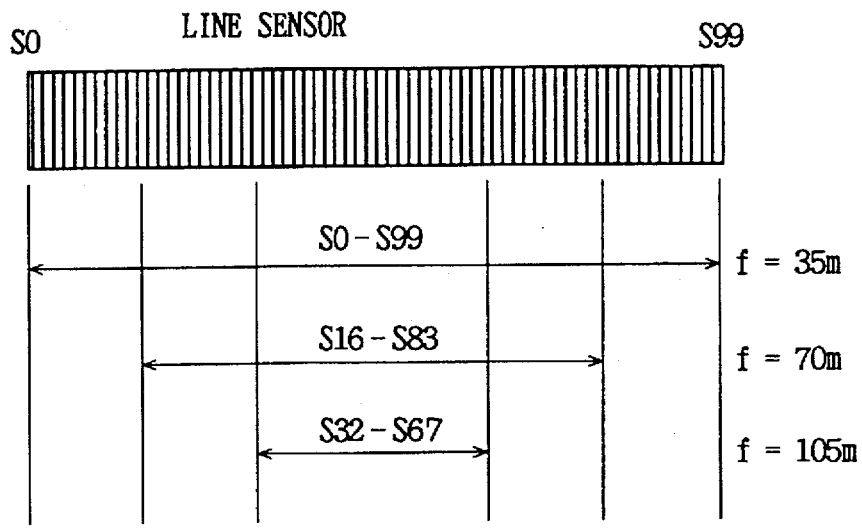
FIG. 5 shows the relationship between the focal length of a photographic variable magnification lens 55 and the pixel of a line sensor selected as the quantizing reference of the camera of FIG. 1.

FIG. 5 show the relationship between the focal length of photographic variable magnification lens 55 of the camera distance measuring apparatus of the present invention and the pixel of the line sensor selected as the pixel used for quantizing reference.

The camera of the present embodiment is implemented so that the width of the distance measuring frame and the range of the object projected on the line sensor match when the focal length f of photographic variable magnification lens 55 is 35 mm (shortest length). As mentioned before, the range of the object projected on the line sensor will become greater than the range of the distance measuring frame when the focal length of photographic variable magnification lens 55 is altered. The pixel range of the line sensor corresponding to the range of the distance measuring apparatus at the focal lengths of 35 mm, 70 mm and 105 mm is as shown by the arrows in FIG. 5. The pixel in the range of FIG. 5 are selected in selection of a pixel used for quantizing reference.

Figure 6:
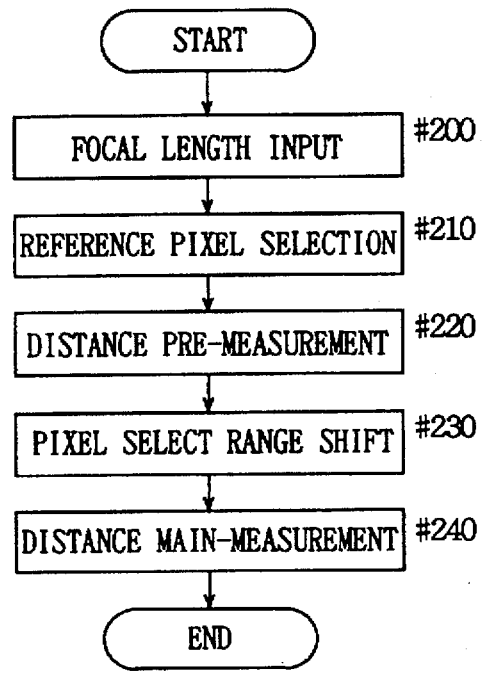
FIG. 6 is a flow chart of a modification of the operation of the distance measuring apparatus of FIG. 2 in distance measurement.

FIG. 6 is a distance measuring operation modification of the camera distance measuring apparatus of the present invention.

First, the focal length of photographic variable magnification lens 55 is input (#200). A pixel used for quantizing reference is selected (#210). Then, distance pre-measurement is carried out (#220). The range of the pixels used for quantizing reference is shifted according to the distance measuring result (#230). Then, the distance is measured again (distance main measurement: #240). Thus, the precise distance up to an object in the distance measuring frame can be detected.

Figure 7:
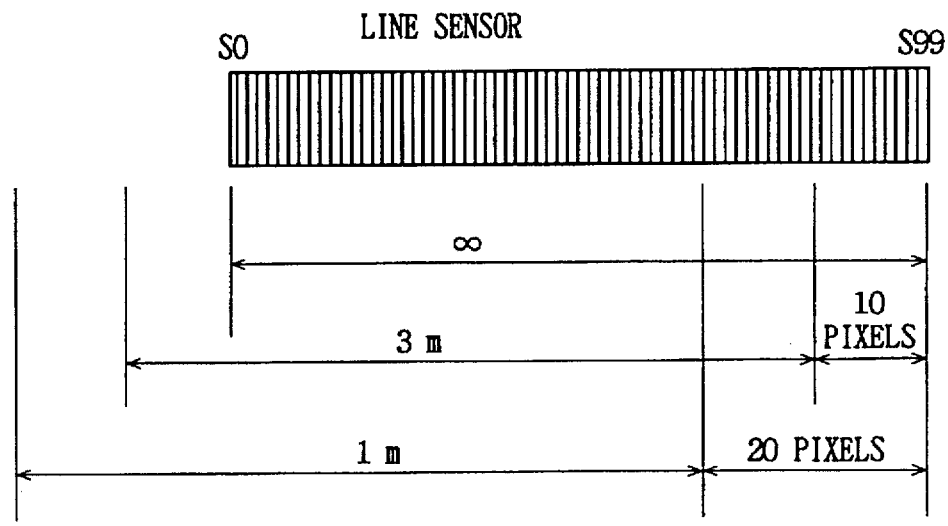
FIG. 7 shows the relationship between the distance measuring result by a distance pre-measuring result and the shift amount of the pixel range that is selected as the quantizing reference of the distance measuring apparatus of FIG. 6.

FIG. 7 shows the relationship between the distance measuring result by the distance pre-measurement result and the shifted range of pixels used for quantizing reference.

For the sake of simplification, description is provided only for the case where the focal length of photographic variable magnification lens 55 is 35 mm. When the object becomes closer to the camera of the present embodiment, discrepancy between the distance measuring frame and the distance measuring area occurs. This amount of discrepancy is approximately 10 pixels when the object distance is 3 m and approximately 20 pixels when the object distance is 1 m in the distance measuring apparatus of the camera of the present embodiment. The distance measuring apparatus stores in advance the relationship between the object distance and the amount of discrepancy to shift the range of the pixels used for quantizing reference according to the result of the distance pre-measurement. The same applies for the other focal lengths (70 mm, 105 mm).

Although the present embodiment is implemented so that the pixel used for quantizing reference is selected at the unit of 1 pixel of the line sensor, selection of quantizing reference can be made with a plurality of pixels as one unit. This allows the number of signal lines for the quantizing reference select signal to be reduced.

Although the present embodiment was described of the case where the focal length of the photographic variable magnification lens is switched among three levels, the present invention is applicable to a zoom lens where the focal length is continuously altered.

Since the range of pixels used for quantizing reference is altered according to the distance measuring frame in the charge accumulation operation for distance measurement, the disadvantages mentioned before caused by an object of high luminance outside the distance measuring frame can be eliminated.

Figure 8:
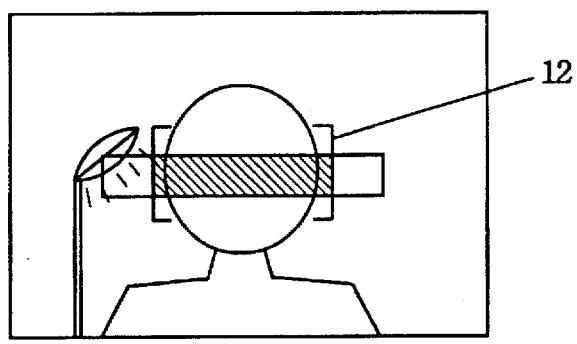
FIG. 8 shows a relationship between a finder image and a sensor output of the camera adapting the distance measuring apparatus of FIG. 2.
Figure 8:
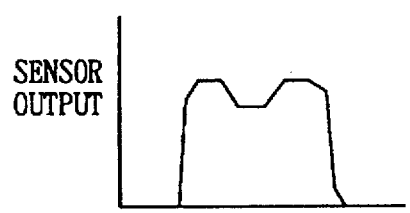
Figure 17:
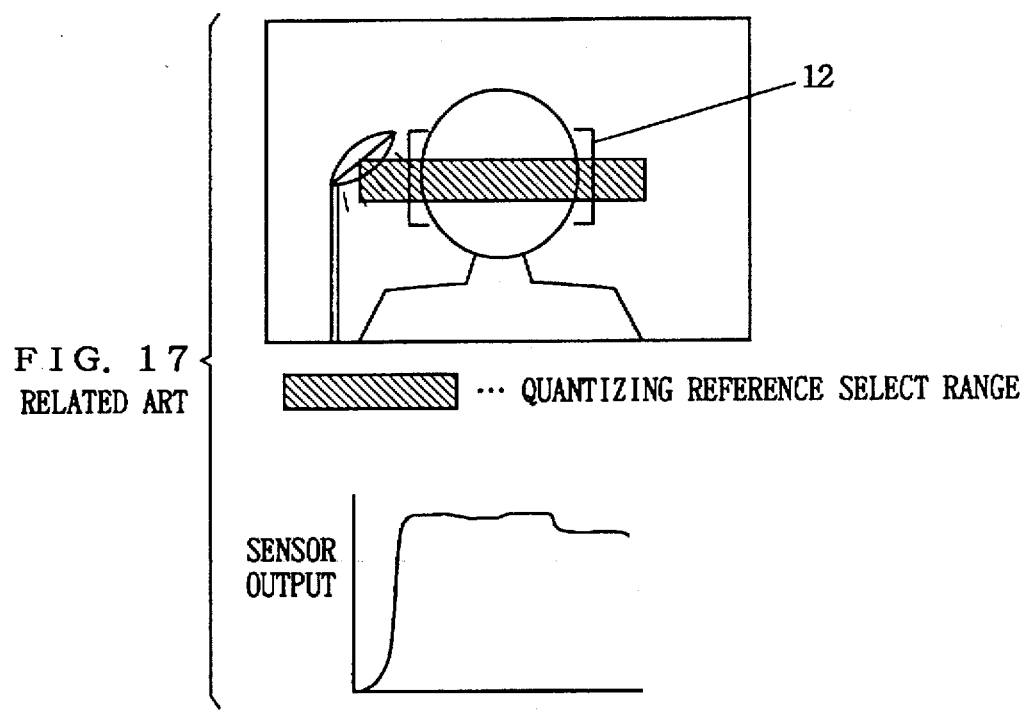
FIG. 17 is a diagram showing the relationship between a finder image and sensor output of a camera adapting a conventional distance measuring apparatus.

FIG. 8 shows the case where there is a bright object outside a distance measuring frame 12. Since the pixels corresponding to that bright object are not used for quantizing reference, the contrast of the sensor output can be improved (comparable to the related art of FIG. 17).

Second Embodiment

Figure 9:
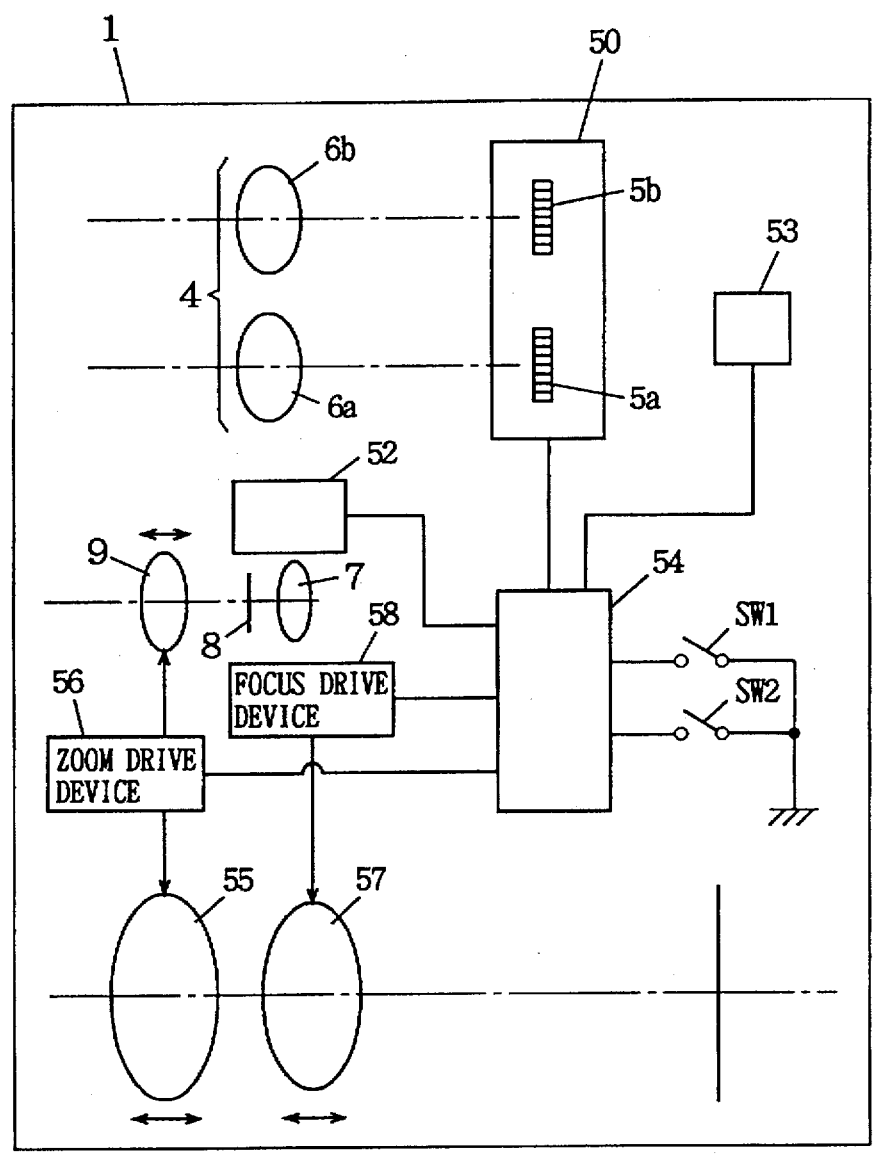
FIG. 9 is a block diagram showing the structure of an autofocus camera adapting the distance measuring apparatus according to the second embodiment of the present invention.

Referring to the block diagram of FIG. 9 showing the structure of an autofocus camera adapting a distance measuring apparatus according to the second embodiment of the present invention, a camera main body 1 includes a distance measuring unit 4. Distance measuring unit 4 includes a distance measurement IC (referred to as AFIC hereinafter) 50 with a pair of left and right line sensors 5a and 5b, and left and right lens 6a and 6b for having line sensors 5a and 5b form an image according to light from an object. Camera main body 1 further includes a distance measuring calculation device 54 formed of a microprocessor and connected to AFIC 50, a photographic variable magnification lens 55, a zoom drive device 56 for shifting photographic variable magnification lens 55, a focus adjustable lens 57, and a focus drive device 58 for altering the position of focus adjustable lens 57.

Each of line sensors 5a and 5b is formed of a row of a plurality of photoelectric conversion elements.

The focal length of photographic variable magnification lens 55 is switched among 25 mm, 50 mm, and 75 mm according to the operator.

The finder is a real image type zoom finder for forming an image of an object on an image forming plane 8 by an objective lens 9. The formed image of an object can be viewed by an eye piece 7. Objective lens 9 moves in cooperation with zoom drive device 56 to have the focal length altered. In contrast, the focal length of distance measuring unit 4 is constant independent of the focal length of photographic variable magnification lens 55. A distance measuring frame (fixed) is drawn on an image forming plane 8.

Camera main body 1 further includes a brightness measuring device 52 for measuring the illuminance of an object, a shooting mode select unit 53 for optimizing the camera shooting control according to the shooting target, and two switches SW1 and SW2 operated in cooperation with a shutter release button not shown.

Switch SW1 is closed at the first stroke of the release button. Switch SW2 is closed when the release button is further depressed. In response to a closed state of switch SW1, distance measuring calculation device 54 designates initiation of photoelectric conversion by line sensors 5a and 5b to AFIC 50 to initiate distance measurement. The photoelectric conversion element to be used is selected according to the focal length of zoom drive device 56, and information from brightness measuring apparatus 52 and shooting mode select unit 53. In response to a closed state of switch SW2, distance measuring calculation device 54 drives focus adjustable lens 57 via focus drive device 58 according to the distance measuring value. Then, shooting is effected.

When the focal length of photographic variable magnification lens 55 is altered, the size of the object image in the finder changes by objective lens 9 of the finder. A discrepancy between the distance measuring frame in the finder and the actual distance measuring area is generated (parallax caused by change in focal length) since the distance measuring frame and the focal length of AF lens 6a and 6b do not change. The camera of the present embodiment is implemented so that the distance measuring frame substantially matches the distance measuring area when the focal length of photographic variable magnification lens 55 is 25 mm. Therefore, the distance measuring area will become greater than the area of the distance measuring frame when the focal length of photographic variable magnification lens 55 is altered to 50 mm or 75 mm.

Figure 10:
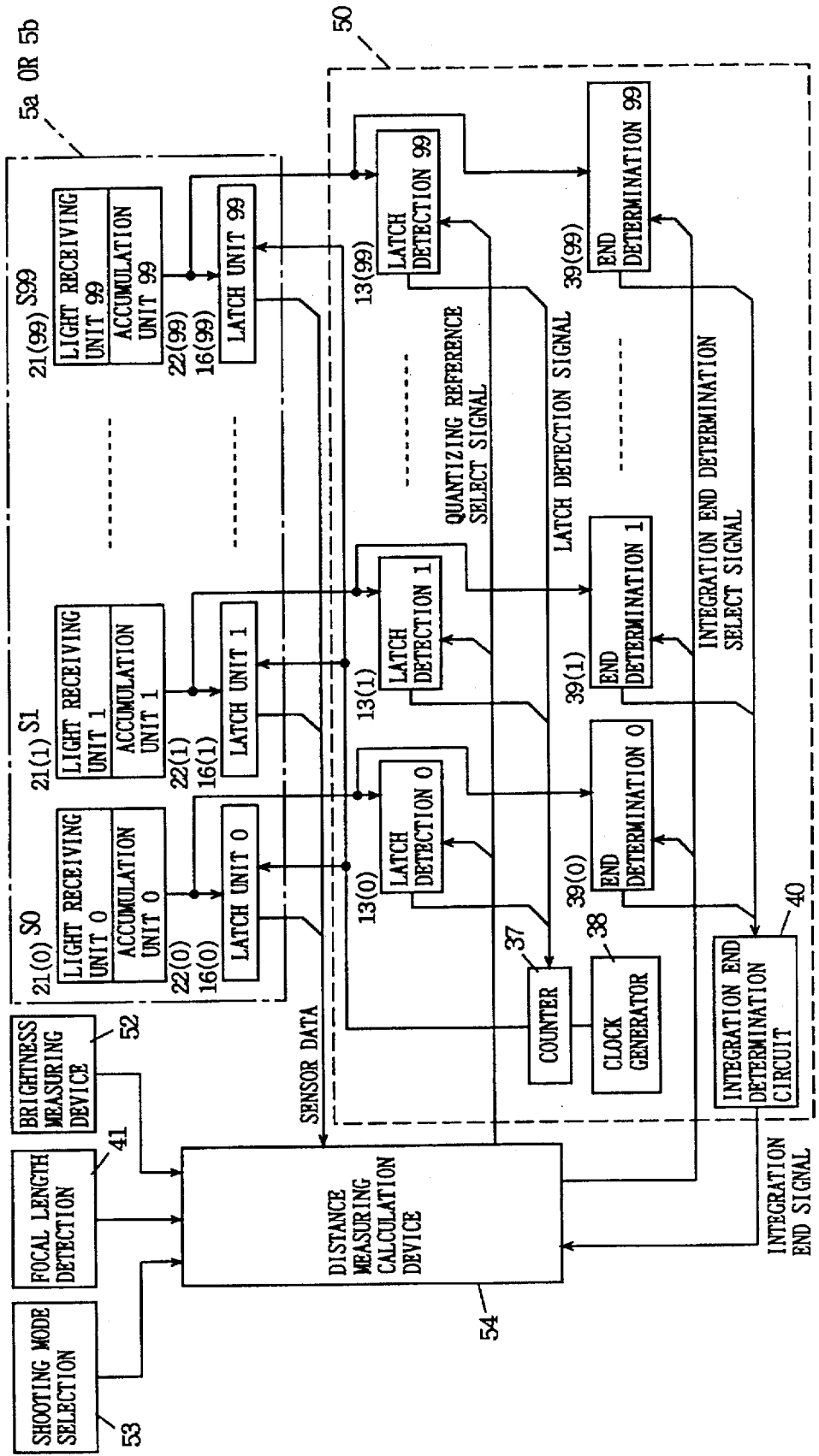
FIG. 10 is a block diagram of the distance measuring apparatus of FIG. 9.

FIG. 10 is a block diagram of the distance measuring apparatus of FIG. 9.

Referring to FIG. 10, the distance measuring apparatus includes a distance measuring calculation device 54, a shooting mode select unit 53 connected to distance measuring calculation device 54, a focal length detection unit 41, a brightness measuring device 52, line sensors 5a and 5b, and an AFIC 50.

Each of line sensors 5a and 5b is formed of 100 pixels (photoelectric conversion elements) S0–S99. Each pixel is formed of a light receiving unit 21(0)–21(99) and an accumulation unit 22(0)–22(99). For the sake of simplification, only one of the pair of line sensors 5 and 5b is shown in FIG. 10.

Each of line sensors 5a and 5b includes a latch unit 16(0)–16(99) for latching a count value of counter 37.

AFIC 50 includes latch detection units 13(0)–13(99) corresponding to respective pixels, end determination units 39(0)–39(99) for determining completion of integration, an integration end determination circuit 40 for receiving a signal from end determination unit 39 to determine integration completion, a clock generator 38 and a counter 37 receiving a latch detect signal from latch detection unit 13 for initiating counting.

A circuit of one of light receiving units 21(0)–21(99) and one of accumulation units 22(0)–22(99) of FIG. 2 is as shown in FIG. 3.

More specifically, the circuit includes a photodiode 25, a capacitor 26, and a sense amplifier 27. Photodiode 25 corresponds to light receiving unit 21, and capacitor 22 and sense amplifier 27 correspond to accumulation unit 22.

A current generated in response to light impinged upon photodiode 25 is stored in capacitor 26. When the voltage of capacitor 26 arrives at a predetermined voltage VREF, sense amplifier 27 provides a latch signal. Capacitor 26 is reset by reset means not shown prior to initiation of charge accumulation for measurement to initiate charge accumulation from 0 V.

The feature of the distance measuring apparatus will be described hereinafter with reference to FIG. 10. The distance measuring apparatus of the present embodiment is characterized in that distance measuring calculation device 54 selects a pixel used for quantizing reference and a pixel used for determination of integration completion.

A quantizing reference select signal and an integration completion determination select signal are used to select respective pixels. These selections are carried out according to a signal output from shooting mode select unit 53, focal length detection unit 41, and brightness measuring device 52. Focal length detection unit 41 detects the focal length according to an output of an encoder provided at a lens barrel and the like of photographic variable magnification lens 55.

When light is incident on line sensors 5a and 5b, the brightest pixel provides the first latch signal. If that pixel is selected as a pixel used for quantizing reference by distance measuring calculation device 54, the time period on the basis of that time point when that pixel provides a latch signal up to a time point when another pixel provides a latch signal is stored in latch units 16(0)–16(99).

Even if the pixel first providing a latch signal is not selected as the pixel used for quantizing reference by distance measuring calculation device 54, that pixel is not used for reference in quantization.

The end of integration, i.e., completion of distance measurement, is effected upon the earlier occurrence of the following (1) or (2).

(1) When measurement is completed up to the pixel darker in brightness by 4 EV (exposure value) than the brightness of the pixel of quantizing reference.

(2) When all the pixels selected by distance measuring calculation device 54 as the pixel used for determining integration completion output a latch signal.

By ending the integration at the above (2), it is no longer necessary to wait for integration to be completed for a pixel not required to output a latch signal. Therefore, the time required for distance measurement can be reduced even when the luminance is low.

The operation of the distance measuring apparatus will be described hereinafter.

Switch SW1 is closed at the first stroke of the release button by an operator of the camera. In response, distance measuring calculation device 54 designates initiation of distance measurement to AFIC 50.

In response to designation of initiating distance measurement, capacitor 26 of accumulation units 22(0)–22(99) in line sensors 5a and 5b is reset to initiate charge accumulation. As mentioned before, a latch signal is output from accumulation units 22(0)–22(99) when the voltage of capacitor 26 arrives at a predetermined voltage VREF.

A latch signal is applied to each of latch detection units 13(0)–13(99). If the pixel from which a latch signal is output is selected as the pixel used for quantizing reference by distance measuring calculation device 54, latch detection unit 13 receiving the latch signal provides a latch detection signal to counter 37.

At the input of the first latch detection signal, counter 37 initiates counting from 0. Counting is effected by adding the pulse output from clock generator 38.

A latch signal is also applied to latch units 16(0)–16(99). Latch units 16(0)–16(99) receive and latch a count value of counter 37 upon receiving a latch signal from a corresponding pixel.

More specifically, a latch unit 16 corresponding to a pixel of quantizing reference latches the value 0. Then, latch unit 16 receiving a subsequent latch signal latches a count value of 0 to 255 of counter 37 succeeding output of a latch signal from the pixel of quantizing reference.

Latch unit 16 of a pixel not used for quantizing reference and which is brighter than the pixel of quantizing reference latches the value of counter 37 before counter 37 initiates counting, which is 0.

Time $t_n$ for counting a count value of (n−1) to a count value of n is set to be proportional to $2^n$. When the luminance brightness of the pixel for quantizing reference is x[EV], the luminance of the pixel providing a latch signal at count value 63 is (x−1)[EV], the luminance of the pixel providing a latch signal at count value 127 is (x−2)[EV], the luminance of the pixel providing a latch signal at count value 191 is (x−3)[EV] and the luminance of the pixel providing a latch signal at count value 255 is (x−4[EV], as shown in FIG. 11.

By measuring the distance until the count value arrives at 255, measurement up to a pixel darker by 4[EV] than the pixel of quantizing reference can be effected.

A latch signal is also simultaneously provided to end determination units 39(0)–39(99).

An end determination unit corresponding to a pixel not used for determination of integration completion provides an end signal to integration end determination circuit 40 regardless of whether a latch signal from a corresponding pixel is input or not.

The end determination unit corresponding to a pixel used for determination of integration accumulation provides an end signal to integration end determination circuit 40 when a latch signal is provided from that pixel.

Integration end determination circuit 40 provides an integration end signal to distance measuring calculation device 54 when the count value of counter 37 arrives at 255 or when all end determination units 39(0)–39(99) output an end signal. Thus, integration is completed. A latch unit corresponding to a pixel not yet providing a latch signal when the integration end signal is output latches the count value of counter 37 at the time point when the integration end signal is output.

Integration ends when the integration end signal is output.

Distance measurement is carried out using data of latch units 16(0)–16(99) obtained by integration. Focus drive device 58 shifts focus adjustable lens 57 according to the distance measuring result to obtain focus.

Figure 12:
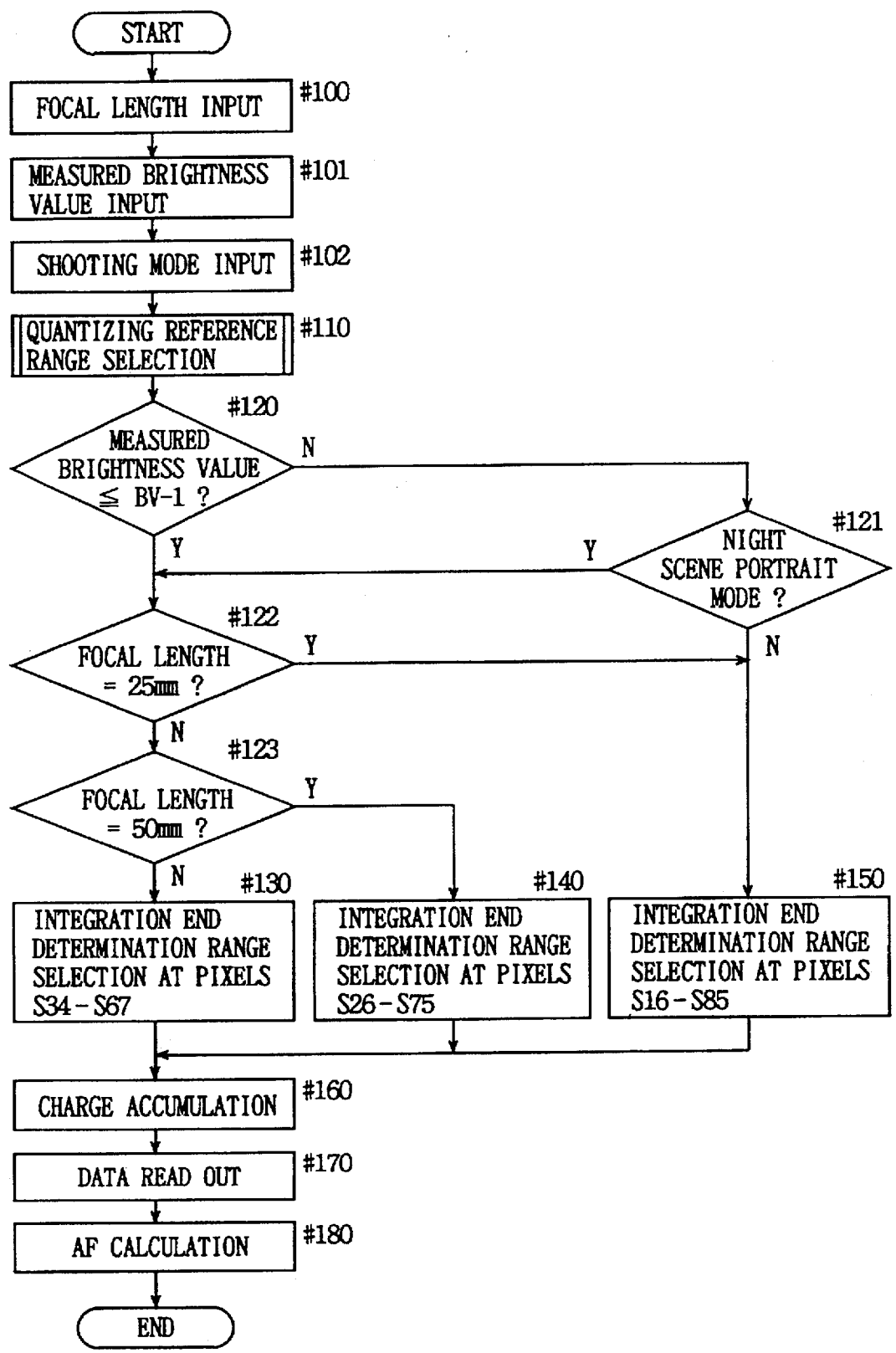
FIG. 12 is a flow chart of the process carried out by a distance measuring calculation device 54 of FIG. 10.

FIG. 12 is a flow chart of the distance measuring operation carried out by the distance measuring apparatus of FIG. 10.

At step #100, the focal length of photographic variable magnification lens 55 is input from focal length detection unit 41. At step #101, a measured brightness value from brightness measuring device 52 is input. At step #102, a shooting mode is entered from shooting mode select unit 53.

At step #110, a pixel used for quantizing reference is selected according to the focal length of photographic variable magnification lens 55. Details of this process will be described afterwards.

At step #120, determination is made whether measured brightness value BV is below or equal to −1. If YES at step #120, the program proceeds to step #122 where determination is made whether the focal length is 25 mm.

If NO at step #122, the program proceeds to step #123 to determine whether the focal length is 50 mm or not.

Figure 14:
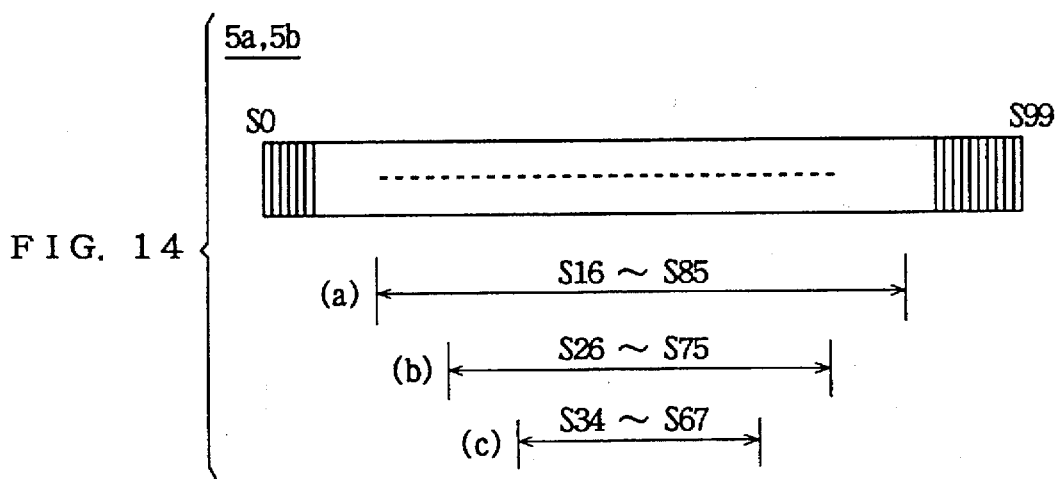
FIG. 14 shows the range of pixels of line sensors 5a and 5b selected at steps #130, #140, and #150 of FIG. 13 and steps #230, #240 and #250 of FIG. 13.

If NO at step #123, the focal length is 75 mm, and the program proceeds to step #130 where the pixel used for determining integration completion is set in the range of S34–S67 (refer to FIG. 14(c)).

If YES at step #123, the program proceeds to step #140 where the pixel used for determination of integration completion is set to the range of S26–S75 (refer to FIG. 14(b)).

If NO at step #120, the program proceeds to step #121 where determination is made whether a night scene portrait mode (a mode for shooting a dark scene) is set as the shooting mode.

If YES at step #121, the process from step #122 is carried out.

If NO at step #121 or YES at step #122, the program proceeds to step #150 where the pixel used for determination of integration completion is set to the range of S16–S85 (refer to FIG. 14(a)).

Following determination of the range of pixels to be used, the program proceeds to step #160 where charge accumulation of line sensors 5a and 5b is carried out. When charge accumulation ends, the program proceeds to step #170 where distance measuring calculation device 54 reads out the data in the latch unit. At step #180, autofocus (AF) calculation is carried out. Thus, a distance measuring operation ends.

Figure 13:
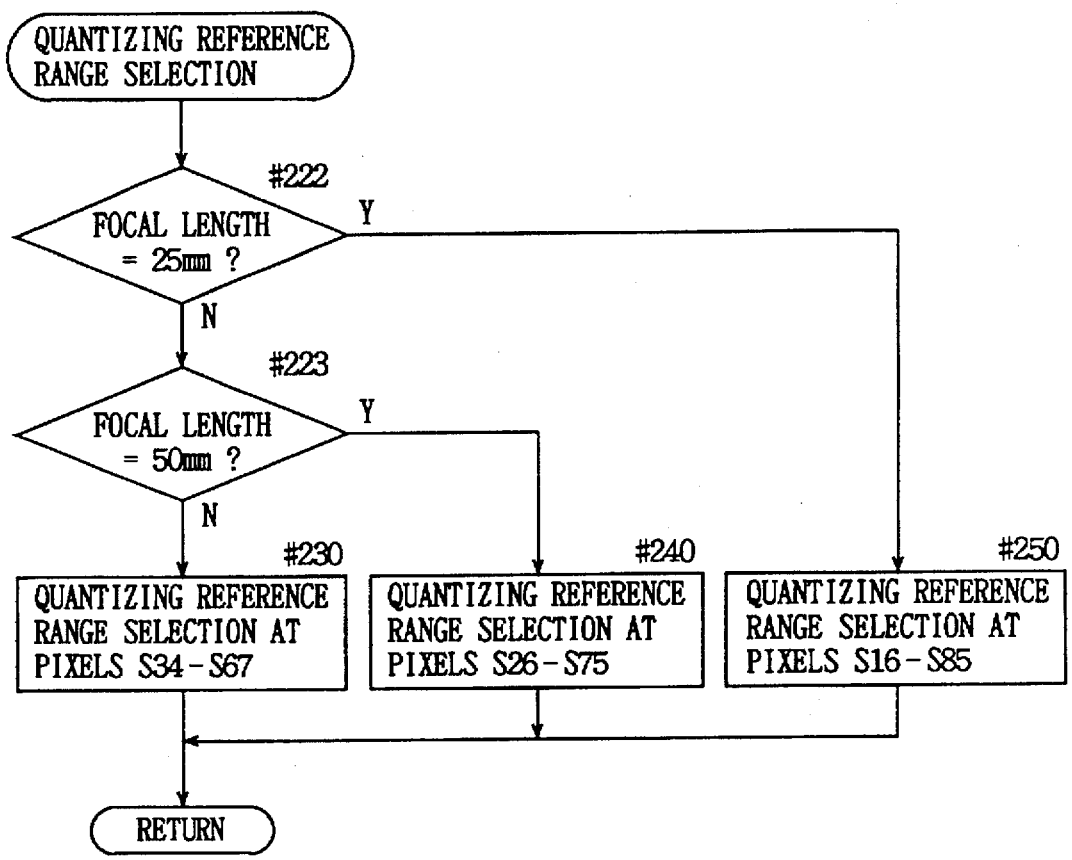
FIG. 13 is a flow chart showing a process of a quantizing reference range select process (#110).

FIG. 13 is a flow chart showing the quantizing reference range select process (#110) of FIG. 12.

Referring to FIG. 13, determination is made whether the focal length is 25 mm at step #222. If YES, the program proceeds to step #250 where pixels S16–S85 are selected as the pixel range used for quantizing reference.

If NO at step #222, the program proceeds to step #223 where determination is made whether the focal length is. 50 mm or not. If YES at step #223, the program proceeds to step S240 where pixels S26–S75 are selected as the pixel range used for quantizing reference.

If NO at step #223, the program proceeds to step #230 where pixels S34–S67 are selected as the pixel range used for quantizing reference.

Figure 15:
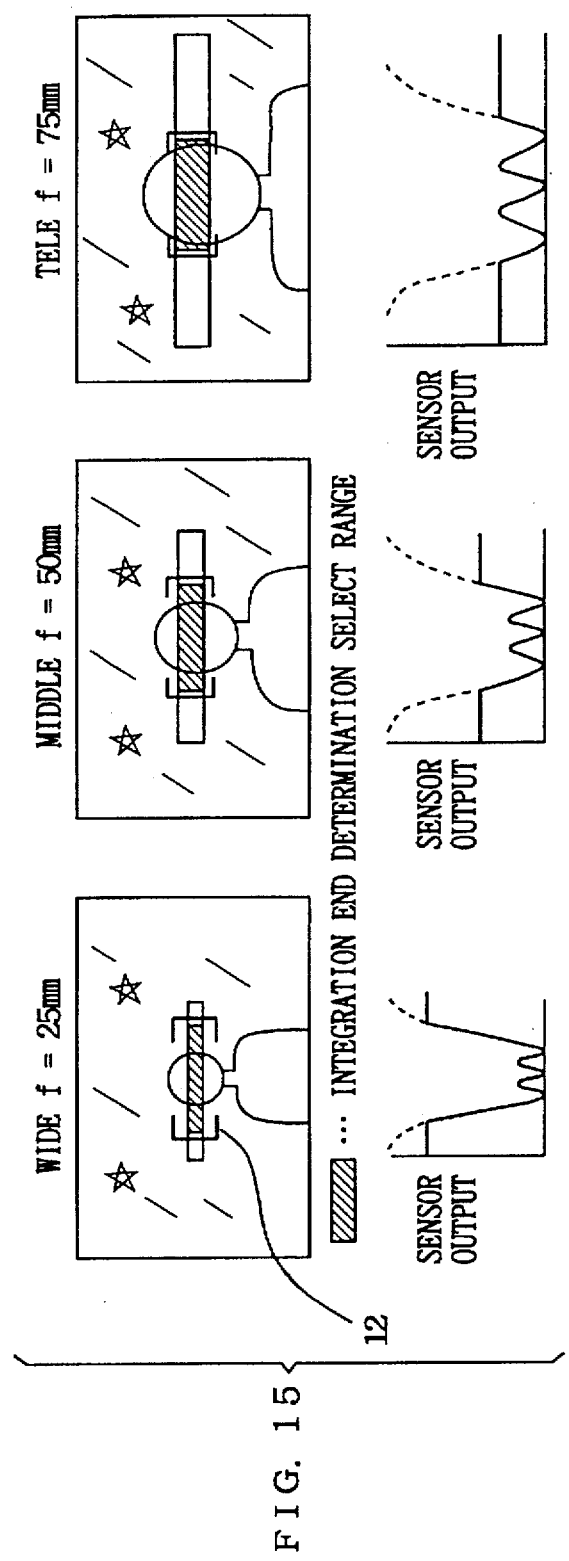
FIG. 15 is a diagram for describing the state of varying pixels used in determining integration completion according to variation in the focal length.

FIG. 15 shows the relationship between the focal length f of photographic variable magnification lens 55 and the pixel of the line sensor used for determination of integration completion of the camera distance measuring apparatus of the present invention. The sensor output (output of latch unit) is together shown in FIG. 15.

The camera of the present embodiment is implemented so that the width of the line sensors substantially matches distance measuring frame 12 when focal length f is 25 mm (shortest length). The range of the line sensor will become greater than the range included in distance measuring frame 12 when the focal length becomes 50 mm or 75 mm.

More specifically, the range of the pixels of the line sensor corresponding to distance measuring frame 12 for respective cases of focal length f=25 mm, 50 mm and 75 mm is indicated by the shaded region.

In the present embodiment, the pixels in the shaded range are selected as the pixel used for determination of integration completion. In other words, pixels of the line sensor outside the range of distance measuring frame 12 will not be used for determination of integration completion.

Thus, the pixel used for determination of integration completion is set to be a pixel in the distance measuring frame. Integration will be terminated when integration for all the pixels in the distance measuring frame is completed as shown by the solid line of the sensor output of FIG. 15. Since the latch unit of a pixel outside the distance measuring frame latches the count value of the counter 37 at the time point when integration is terminated, the same count value is taken.

In the conventional art, when the background is extremely darker than the object in the distance measuring frame, integration was carried out for all the pixels corresponding to the background portion, or until integration of the pixel darker by four levels than the brightest pixel ends as shown by the dotted line in FIG. 15. In contrast, determination of integration completion is carried out with only the pixels in the distance measuring frame in the present embodiment. Therefore, the time required for distance measurement can be reduced.

Figure 16:
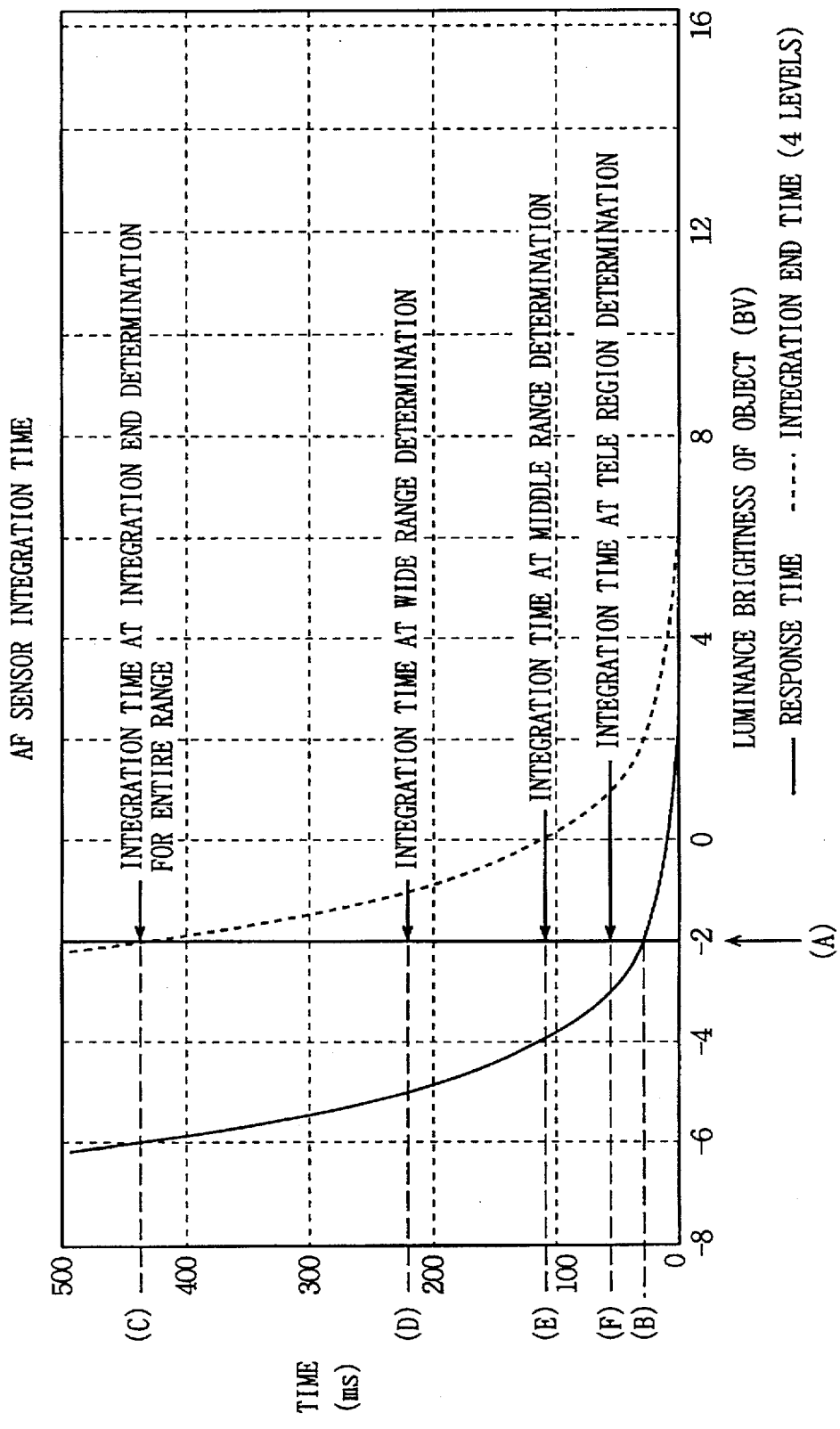
FIG. 16 is a diagram for describing the advantage of the present invention.

FIG. 16 is a diagram for describing reduction in the integration time according to the distance measuring apparatus of the present embodiment.

In principle, the line sensor used in the present embodiment converts the charge accumulation time according to luminance of an object into sensor data. The time required for detecting a latch for a pixel of quantizing reference (response time) increases in an exponential functional manner as the luminance of the object BV becomes darker.

In general, integration is carried out for pixels that are darker by 4 EV in quantity of light than the pixel used for quantizing reference. Therefore, the time when integration ends is 16 times ($2^4$ times) the response time of the pixel for quantizing reference.

When the object is dark or when the background is dark with respect to the object, determination of integration completion is carried out only for the range corresponding to the main object in the distance measuring frame in the present invention. Therefore, the time required for distance measurement can be reduced.

Referring to FIG. 16, when the luminance brightness of the object is BY-2 as shown in (A) and the background is dark enough, the time period starting from initiation of distance measurement up to output of a latch signal from the pixel of quantizing reference is as shown in (B). The time period for the pixel of the background which is darker by 4 levels of BV-6 is shown by (C).

In the conventional art, the time required for integration increases in an exponential functional manner as the brightness of an object is lower when the background is darker than the object. In the present embodiment, determination of integration completion is carried out only with pixels in the distance measuring frame in which an object is present. Therefore, integration ends at the time period indicated by (D), (E), and (F) when the focal length is 25 mm (WIDE region determination), 50 mm (MIDDLE region determination), and 75 mm (TELE region determination), respectively. According to the present embodiment, the time required for integration for distance measurement is significantly reduced than the conventional case. Therefore, there is no influence of camera-shaking, and precise distance measurement is allowed.

Determination is made whether the pixel to be used for determination of integration completion of the line sensor is selected at the unit of 1 pixel for the line sensor in the present embodiment. However, selection can be made using a plurality of pixels as one unit for determination of integration completion.

Although the present embodiment was described in which the focal length of the photographic variable magnification lens is switched among three levels, the present invention is applicable for a camera in which the focal length is altered continuously.

In the present embodiment, the range of pixels used for quantizing reference is set equal to the range of pixels used for determination of integration completion. However, the pixel range can be set independently.

Furthermore, the pixel used for calculating the distance can be used for determination of the integration completion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A distance measuring apparatus comprising:

a pair of photoreceptor arrays formed of a plurality of pixels, a detector for detecting a focal length of a photographic lens, a select circuit for selecting one or more pixels out of said plurality of pixels that can be set as a pixel for quantizing reference according to a detected result of said detector, a setting circuit for setting the time when at least one of said selected pixels completes charge accumulation as the time of quantizing reference, and a measurement unit for quantizing outputs of said photoreceptor arrays to measure the distance up to an object according to said set time for quantizing reference.

2. The distance measuring apparatus according to claim 1, wherein said select circuit selects a plurality of pixels, and wherein said setting circuit sets a pixel out of said plurality of pixels that first completes charge accumulation as a pixel of quantizing reference, and the time when said pixel of quantizing reference completes charge accumulation as the time of quantizing reference.

3. A distance measuring apparatus comprising:

a pair of photoreceptor arrays formed of a plurality of pixels, a measurement unit for measuring a distance up to an object by quantizing outputs from said photoreceptor arrays, a select circuit for selecting one or more pixels out of said plurality of pixels as a pixel of quantizing reference according to a measured result of said measurement unit, and a setting circuit for setting the time when at least one of said selected pixels completes charge accumulation as the time of quantizing reference.

4. The distance measuring apparatus according to claim 3, wherein said select circuit selects a plurality of pixels, and wherein said setting circuit sets a pixel out of said plurality of pixels that first completes charge accumulation as a pixel of quantizing reference, and the time when said pixel of quantizing reference completes charge accumulation as the time of quantizing reference.

5. A distance measuring apparatus comprising:

a pair of photoreceptor arrays formed of a plurality of pixels, a select circuit for selecting a pixel out of said plurality of pixels as a pixel used for determination of integration completion, a determination circuit for determining integration completion using a signal from said selected pixel, and a measurement unit for measuring a distance up to an object by quantizing outputs from said photoreceptor arrays.

6. The distance measuring apparatus according to claim 5, further comprising a finder, wherein said select circuit selects a pixel corresponding to a distance measuring frame displayed in said finder.

7. The distance measuring apparatus according to claim 5, further comprising a brightness measuring circuit, wherein said select circuit effects selection according to an output of said brightness measuring circuit.

8. The distance measuring apparatus according to claim 7, wherein said select circuit effects selection when an output of said brightness measuring circuit is below a predetermined value.

9. The distance measuring apparatus according to claim 5, wherein said select circuit effects selection according to a shooting mode.

10. The distance measuring apparatus according to claim 9, wherein said shooting mode is a night scene portrait mode.

11. The distance measuring apparatus according to claim 5, further comprising a circuit selecting a pixel that can be set as quantizing reference.

12. A distance measuring apparatus comprising:

a pair of photoreceptor arrays formed of a plurality of pixels, a focal length detection circuit for detecting a focal length of a photographic lens, a select circuit for selecting a pixel used for quantizing reference and a pixel used for determination of integration completion according to said detected focal length, and a measurement unit for measuring a distance up to an object by quantizing outputs from said photoreceptor arrays according to an output of said selected pixel.

* * * * *